US 6,726,330 B2

(12) United States Patent
Kitabayashi

(10) Patent No.: US 6,726,330 B2
(45) Date of Patent: Apr. 27, 2004

(54) ELECTRO-OPTICAL APPARATUS AND PROJECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/891,406

(22) Filed: Jun. 27, 2001

(65) Prior Publication Data

US 2002/0018153 A1 Feb. 14, 2002

(30) Foreign Application Priority Data

Jun. 28, 2000 (JP) ........................................ 2000-195016

(51) Int. Cl.⁷ .................... G03B 21/00; G03B 21/14; G03B 21/22
(52) U.S. Cl. ................ 353/31; 353/119; 353/122; 353/20
(58) Field of Search ................ 359/315, 245, 359/246

(56) References Cited

U.S. PATENT DOCUMENTS

| | | | | |
|---|---|---|---|---|
| 4,765,729 A | * | 8/1988 | Taniguchi | 351/163 |
| 6,340,404 B1 | * | 1/2002 | Oka et al. | 156/230 |
| 6,375,328 B2 | * | 4/2002 | Hashizume et al. | 353/30 |
| 6,379,010 B1 | * | 4/2002 | Suzuki et al. | 353/31 |
| 6,423,404 B1 | * | 7/2002 | Ohtsuka et al. | 428/328 |
| 6,623,662 B2 | * | 9/2003 | Wang et al. | 252/502 |

| | | | |
|---|---|---|---|
| 2003/0090195 A1 | * | 5/2003 | Teng ........................ 313/479 |

FOREIGN PATENT DOCUMENTS

| | | |
|---|---|---|
| EP | 0 916 988 A1 | 5/1999 |
| JP | A 58-113016 | 7/1983 |
| JP | A 61-138901 | 6/1986 |
| JP | A 61-279825 | 12/1986 |
| JP | A 4-289801 | 10/1992 |
| JP | A 5-188365 | 7/1993 |
| JP | A 7-258862 | 10/1995 |
| JP | A 08-20734 | 1/1996 |
| JP | A 8-304739 | 11/1996 |
| JP | A 10-20119 | 1/1998 |
| JP | A 2000-147470 | 5/2000 |
| KR | Y1 1995-0004443 | 12/1998 |

* cited by examiner

*Primary Examiner*—Russell Adams
*Assistant Examiner*—Andrew Sever
(74) *Attorney, Agent, or Firm*—Oliff & Berridge, PLC

(57) ABSTRACT

The invention provides an electro-optical apparatus and a projector that can be efficiently fabricated and permit a reduction in manufacturing cost. A pair of substrates and an electro-optical element sandwiched between the pair of substrates are provided to constitute liquid crystal panels. An antistatic layer is provided on an outer surface of at least one of the pair of substrates. Therefore, even if static electricity is generated on the surfaces of the panels, the static electricity escapes to the outside through the antistatic layer, making it possible to prevent dust, fluff, or the like from adhering to the liquid crystal panels. This enables the deterioration of images caused by the adherence of dust, fluff, or the like during a manufacturing process or during the use by a user to be minimized.

18 Claims, 6 Drawing Sheets

ELECTRO-OPTICAL APPARATUS AND PROJECTOR

BACKGROUND OF THE INVENTION

1. Field of Invention

The present invention relates to an electro-optical apparatus that includes a liquid crystal panel, and a projector that employs the electro-optical apparatus.

2. Description of Related Art

Projectors are known that separate a light beam emitted from a light source into beams of three colors, RGB, through a dichroic mirror, modulate the respective beams of colors on the basis of image information through three liquid crystal panels, synthesize the modulated light beams through a cross-dichroic prism, and expand and project a color image through a projection lens.

This type of projector is fabricated by combining components, including an inner case, a liquid crystal panel, a prism, and a projection lens. In the assembly process, where dust or fluff may electrostatically adhere to an image forming region of an electro-optical apparatus formed of liquid crystal panels, and the shadow of the dust or fluff may be projected onto a projection surface, leading to deterioration of image quality.

Furthermore, after the delivery of a product, when a user uses the product, minute dust passing through an air filter, or dust or fluff that has accumulated in the inner case during a manufacturing process, is blown up by a cooling fan and adheres to the liquid crystal panels. The shadow of the dust or fluff may also be projected on an image, leading to deterioration of image quality.

SUMMARY OF THE INVENTION

If dust or fluff adheres to an electro-optical apparatus after assembly as mentioned above, then it is necessary to disassemble a projector body to remove the dust or fluff by using various types of equipment, such as an air gun, a blower, and a dust collector, and reassemble the projector body thereafter. This is required because the gap between the liquid crystal panels constituting the electro-optical apparatus and the prism is so narrow that it is difficult to blow air in by an air gun or similar apparatus. Furthermore, the dust or fluff electrostatically adhering to the electro-optical apparatus cannot be easily removed, and it takes a long time to remove it. In addition, considerable equipment is necessary to remove dust or fluff.

Furthermore, in order to prevent the deterioration of image quality, it is substantially essential to provide the electro-optical apparatus with dust-proof glass to blur the shadow of dust projected onto an image. The dust-proof glass is used to shift the surface, to which dust or the like adheres, from the focal position of a projection lens so as to make the dust less conspicuous on a projection surface, even if dust or the like adheres to a surface (one surface or both surfaces) of a liquid crystal panel or the like.

Attempts to prevent the deterioration of image quality caused by dust or the like have been difficult because complicated work or considerable equipment is required and the number of components is increased in some cases, and manufacturing or maintenance costs are higher.

An object of the present invention is to provide an electro-optical apparatus and a projector that reduce such complicated work, considerable equipment, and an increase in the number of components, enable efficient manufacture and maintenance, and permit a reduction in manufacturing cost or maintenance cost.

To this end, according to the present invention, an electro-optical apparatus is provided that is equipped with a pair of substrates and an electro-optical element sandwiched between the pair of substrates. An antistatic layer is provided on the outer surface of at least one of the pair of substrates.

According to the present invention, since the antistatic layer is formed on the surface of the substrate, even if static electricity is generated on the surface of the substrate, the static electricity escapes to the exterior of the apparatus through the antistatic layer. Thus, electrification to the substrates of the electro-optical apparatus can be reduced, making it possible to minimize the adherence of dust, fluff, or the like to a surface of a substrate. This minimizes deterioration of images caused by the adherence of dust, fluff, or the like during a manufacturing process or during the use by a user.

Moreover, the above feature obviates the need for or simplifies the work required to remove dust, fluff, or the like from a substrate of an electro-optical apparatus and the need for equipment required therefor. Hence, the manufacture and maintenance of the electro-optical apparatus can be efficiently performed, and the cost required for the manufacture and maintenance can be reduced.

In addition, the need for dust-proof glass, which has hitherto been substantially essential, can be obviated. If the need for the dust-proof glass is obviated, then the number of components can be reduced, so that the manufacturing cost can be reduced from this respect also.

Furthermore, since the electrification to a substrate can be reduced, in the case of an electro-optical device equipped with a TFT (thin-film transistor) device or the like, the destruction of the TFT device attributable to electrical discharge can be prevented, and defects in a manufacturing process can be reduced.

In the above, in the present invention, the antistatic layer is preferably formed of an inorganic material. The inorganic material may be exemplified by a composition provided with silica and conductive particulates.

An organic material can be used for the antistatic layer; however, the organic material may cause a problem, such as deterioration or discoloration attributable to light. In contrast thereto, forming the antistatic layer by an inorganic material solves the problem with an organic material, making it possible to prevent the adherence of dust or fluff to a surface of a substrate over an extended period of time.

The conductive particulates include, for example, metals, such as Pd, Pt, Ru, Ag, Au, Ti, In, Cu, Cr, Fe, Zn, Sn, Ta, W, and Pb, or borides, such as $HfB_2$, $ZrB_2$, $LaB_6$, $CeB_6$, $YB_4$, and $GdB_4$, or carbides, such as TiC, ZrC, HfC, TaC, SiC, and WC, or nitrides, such as TiN, ZrN, and HfN, or semiconductors, such as Si and Ge, or carbon. An appropriate one can be selected from among the above.

Preferably, the antistatic layer has a resistance value ranging from $10^6$ to $10^9$ $\Omega/\square$.

If the resistance value exceeds $10^9$ $\Omega/\square$, the electrical resistance will be excessively high, and the antistatic layer will no longer be able to sufficiently release electricity. This may prevent antistatic effect from being fully displayed.

A first projector in accordance with the present invention is provided with the electro-optical apparatus described above.

A second projector in accordance with the present invention is provided with a light source, a color separating optical system that separates a light beam emitted from the light source into a plurality of colors, a plurality of electro-optical apparatuses that modulate the color beams that have been separated by the color separating optical system, a prism that synthesizes the color beams that have been modulated by these electro-optical apparatuses, and a projection lens that projects light emitted from the prism, the electro-optical apparatuses having the construction described above.

In the projector according to the present invention, since the antistatic layer is formed on the surface of the substrate, even if static electricity is generated on the surface of the substrate, the static electricity escapes to the exterior of the apparatus through the antistatic layer. Thus, electrification to the surfaces of the substrates of the electro-optical apparatus can be reduced, making it possible to minimize the adherence of dust, fluff, or the like to the surface of a substrate. This minimizes deterioration of images caused by the adherence of dust, fluff, or the like during a manufacturing process or during the use by a user.

Moreover, the above feature obviates the need for or simplifies the work for removing dust, fluff, or the like from a substrate of an electro-optical apparatus and the need for equipment required therefor. Hence, the manufacture and maintenance of the electro-optical apparatus can be efficiently performed, and the cost required for the manufacture and maintenance can be reduced.

In addition, the need for dust-proof glass, which has hitherto been substantially essential, can be obviated. If the need for the dust-proof glass is obviated, then the number of components can be reduced, so that the manufacturing cost can be reduced from this respect also.

Furthermore, since the electrification to a substrate can be reduced, in the case of an electro-optical device equipped with a TFT (thin-film transistor) device or the like, the destruction of the TFT device attributable to electrical discharge can be prevented, and self-reproach defects in a manufacturing process can be reduced.

When the projector described above is equipped with a component formed of a synthetic resin, the component formed of a synthetic resin is preferably provided with antistatic treatment.

Providing the component made of a synthetic resin, which is prone to generate static electricity, with antistatic treatment, such as application of a surfactant, makes it possible to further securely prevent electrification in the projector. Hence, the dust or fluff brought in by static electricity generated in the component made of a synthetic resin can be reduced. Thus, image deterioration of the projector can be further securely prevented, and the efficiency of manufacture and maintenance will be further enhanced.

The component made of a synthetic resin may be a holding frame installed around a liquid crystal panel.

Providing the holding frame with antistatic treatment makes it possible to prevent dust or the like on the holding frame from moving onto a surface of the substrate of an electro-optical apparatus, so that the adherence of dust or the like to a substrate can be further securely minimized.

Other projectors in accordance with the present invention include an optical element other than the substrate of an electro-optical apparatus, which is disposed in the vicinity of a focus of a projection lens, and which is provided with an antistatic layer or antistatic treatment.

Such an optical element may be a field lens disposed adjacent to a light source or an incident polarizer of an electro-optical apparatus, an emergent polarizer or prism disposed adjacent to a projection lens of the electro-optical apparatus, and a phase plate or a visual compensating film disposed adjacent to at least the light source or the projection lens of the electro-optical apparatus. If the incident polarizer, the phase plate, or the visual compensating film is disposed on a light transmitting substrate formed of glass or the like in a bonded state, then such a light transmitting substrate corresponds to the foregoing optical element.

In the projectors having other configurations in accordance with the present invention, the same advantages as those obtained by forming the antistatic layer on a surface of the substrate of an electro-optical apparatus can be obtained by providing at least one surface of such an optical element with an antistatic layer or antistatic treatment.

DETAILED DESCRIPTION OF PREFERRED EMBODIMENTS

An embodiment of the present invention will be described with reference to the accompanying drawings.

(1) Basic Structure of the Projector

Figure 1:
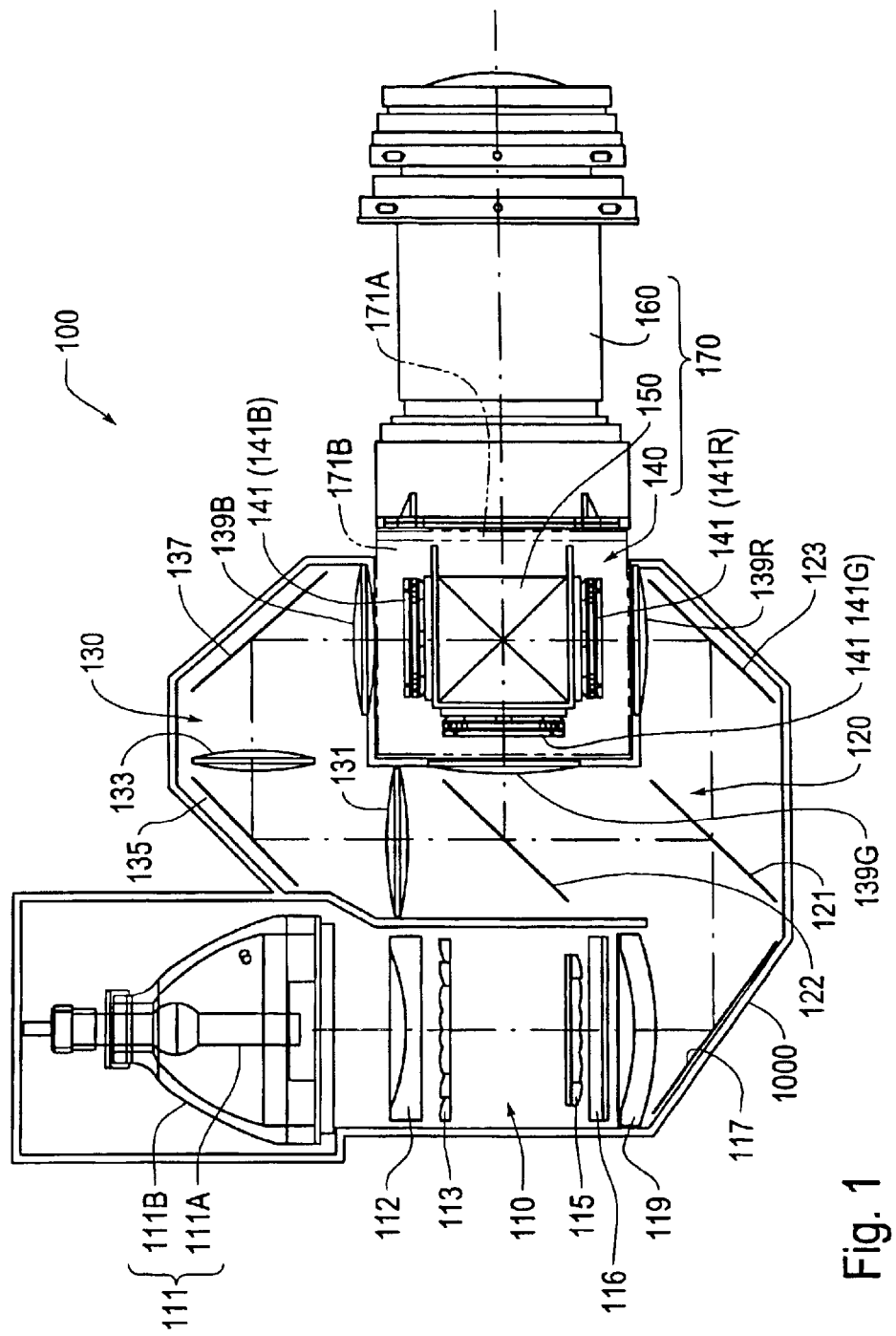
FIG. 1 is a schematic diagram illustrating a structure of a projector according to an embodiment of the present invention.

FIG. 1 shows the structure of a projector 100 according to an embodiment of the present invention. The projector 100 has an integrator illumination optical system 110, a color separating optical system 120, a relay optical system 130, liquid crystal panels 141R, 141G, and 141B, which are electro-optical apparatuses, a cross-dichroic prism 150 serving as a color synthesizing optical system, and a projection lens 160 serving as a projection optical system. These components are housed in an inner case 1000 made of a synthetic resin.

The integrator illumination optical system 110 is equipped with a light source device 111 that includes a light source lamp 111A and a reflector 111B, a first lens array 113, a second lens array 115, a reflecting mirror 117, and a superimposing lens 119. A light beam emitted from the light source lamp 111A is reflected by the reflector 111B so that it is condensed at a converging point, then formed into a substantially parallel beam by a concave lens 112 disposed at a position halfway to the converting point. The light beam is then divided into a plurality of sub-beams by the first lens array 113, and the sub-beams enter the second lens array 115. The sub-beams emergent from the second lens array 115 are polarized into one type of polarized beams by a polarization converting element 116. A specific configuration of such a polarization converting element has been disclosed in Japanese Unexamined Patent Application Publication No. 8-304739. The sub-beams that have been converted into one type of polarized beams by the polarization converting element 116 are substantially superimposed on three liquid crystal panels 141 (liquid crystal panels 141R, 141G, and 141B for the respective colors) that make up an electro-optical apparatus 140, which will be discussed hereinafter.

The color separating optical system 120 equipped with two dichroic mirrors 121 and 122, and a reflecting mirror 123 functions to separate a plurality of sub-beams emitted from the integrator illumination optical system 110 into three color beams of red, green, and blue by the dichroic mirrors 121 and 122.

The relay optical system 130 is provided with an incident lens 131, a relay lens 133, and reflecting mirrors 135 and 137, and functions to guide a color beam, e.g., a blue beam B, separated by the color separating optical system 120 to the liquid crystal panel 141B.

The red and green beams separated by the color separating optical system 120 are applied to the liquid crystal panels 141R and 141G via field lenses 139R and 139G. The blue beam is applied to the liquid crystal panel 141B via the relay optical system 130 and the field lens 139B.

The three liquid crystal panels 141R, 141G, and 141B making up the electro-optical apparatus employ poly-silicon TFTs, for example, as the switching elements thereof. The respective color beams separated by the color separating optical system 120 are modulated on the basis of image information by these three liquid crystal panels 141R, 141G, and 141B to form an optical image.

Incident polarizers 182R, 182G, and 182B are disposed between the field lenses 139R, 139G, and 139B, and the liquid crystal panels 141R, 141G, and 141B. Emergent polarizers 184R, 184G, and 184B are disposed between the liquid crystal panels 141R, 141G, and 141B and the cross-dichroic prism 150. These polarizers may be bonded to the surfaces of the field lenses, the liquid crystal panels, or the surface of the cross-dichroic prism, or provided independently of the members, as necessary.

The cross-dichroic prism 150 forms color images by synthesizing the images that have been modulated for each of the color beams emitted from the three liquid crystal panels 141R, 141G, and 141B. In the cross-dichroic prism 150, a dielectric multilayer film that reflects red beams and a dielectric multilayer film that reflects blue beams are formed in a substantially X pattern along the interfaces of four rectangular prisms, and three color beams are synthesized by these dielectric multilayer films. The color image synthesized by the cross-dichroic prism 150 is emitted from the projection lens 160 and enlarged and projected on a screen.

(2) Structure of the Optical Unit

Figure 2:
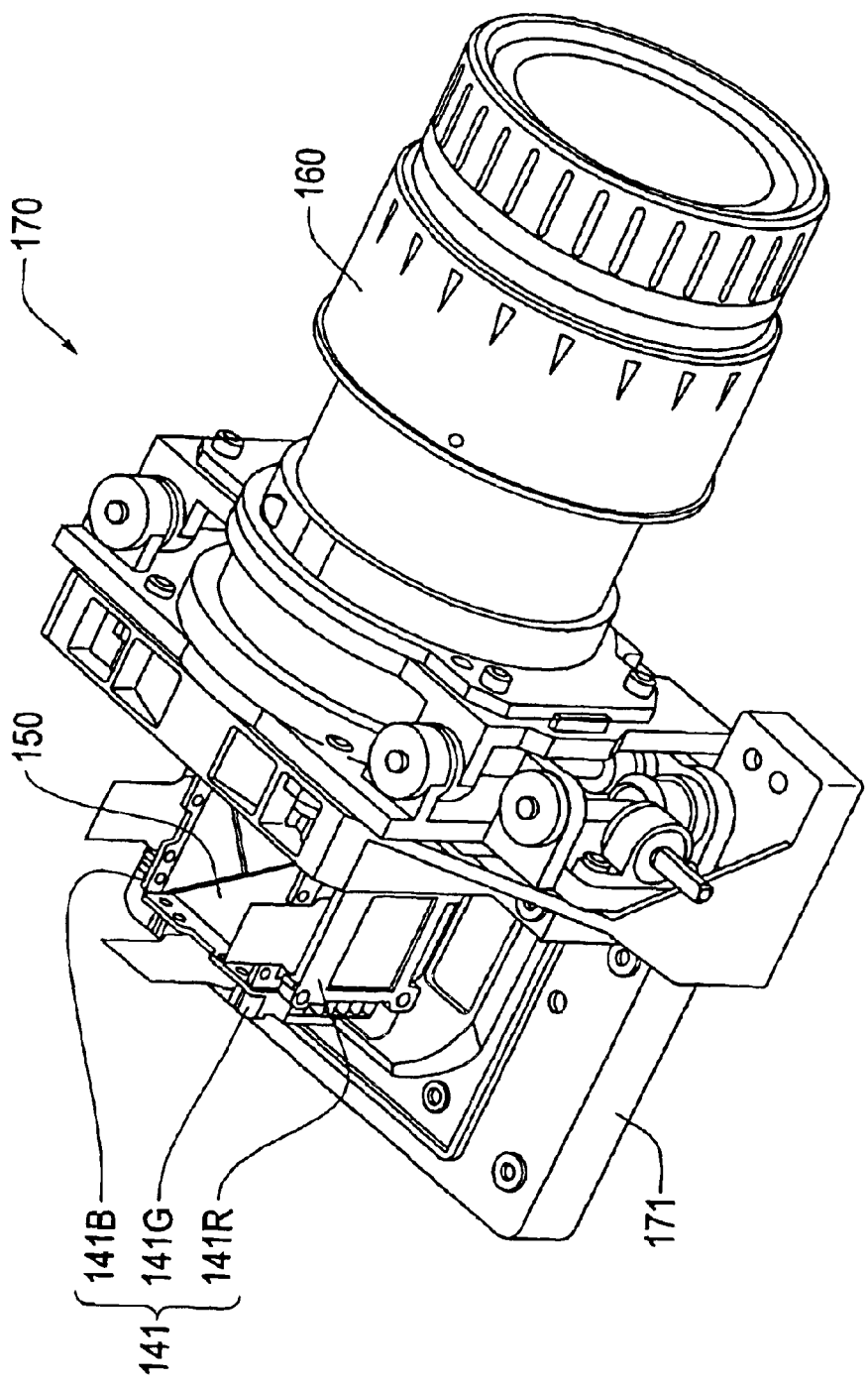
FIG. 2 is a perspective view showing an exterior structure of an optical unit in the embodiment.

In the projector 100 set forth above, the electro-optical apparatus 140, the cross-dichroic prism 150, and the projection lens 160 are combined into an optical unit 170. More specifically, as shown in FIG. 2, the optical unit 170 is equipped with a head body 171 constituting a structure having an L-shaped side surface formed of a magnesium alloy.

The projection lens 160 is fixed by screws to the outer side of a vertical surface of an L-shaped member of the head body 171. The cross-dichroic prism 150 is also fixed by screws to the upper side of the horizontal surface of the L-shaped member of the head body 171.

Figure 3:
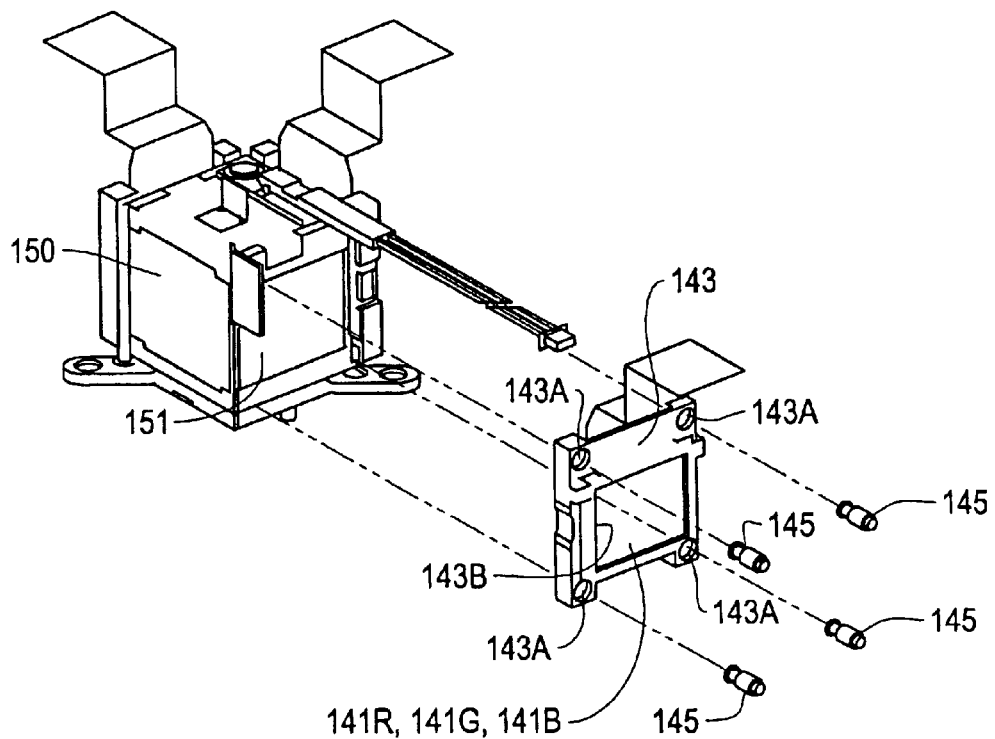
FIG. 3 is an exploded perspective view showing the structure of the optical unit in the embodiment.

The three liquid crystal panels 141R, 141G, and 141B are disposed to surround three side surfaces of the cross-dichroic prism 150. To be more specific, as shown in FIG. 3, the liquid crystal panels 141R, 141G, and 141B are housed in a holding frame 143 made of a synthetic resin, and pins 145 made of a transparent resin are inserted, together with an ultraviolet curing type adhesive agent, into holes 143A formed in the four corner portions of the holding frame 143. This secures the three liquid crystal panels 141R, 141G, and 141B in the proximity of the cross-dichroic prism 150 by the so-called POP (Panel On Prism) structure wherein they are adhesively secured to a beam incident end surface 151 of the cross-dichroic prism 150. The holding frame 143 has a rectangular opening 143B, the liquid crystal panels 141R, 141G, and 141B being exposed at the opening 143B, thus providing an image forming region. More specifically, the color beams R, G, and B are introduced to this portion of the liquid crystal panels 141R, 141G, and 141B to form an optical image based on image information.

(3) Antistatic Layer and Treatment Layer

Figure 4:
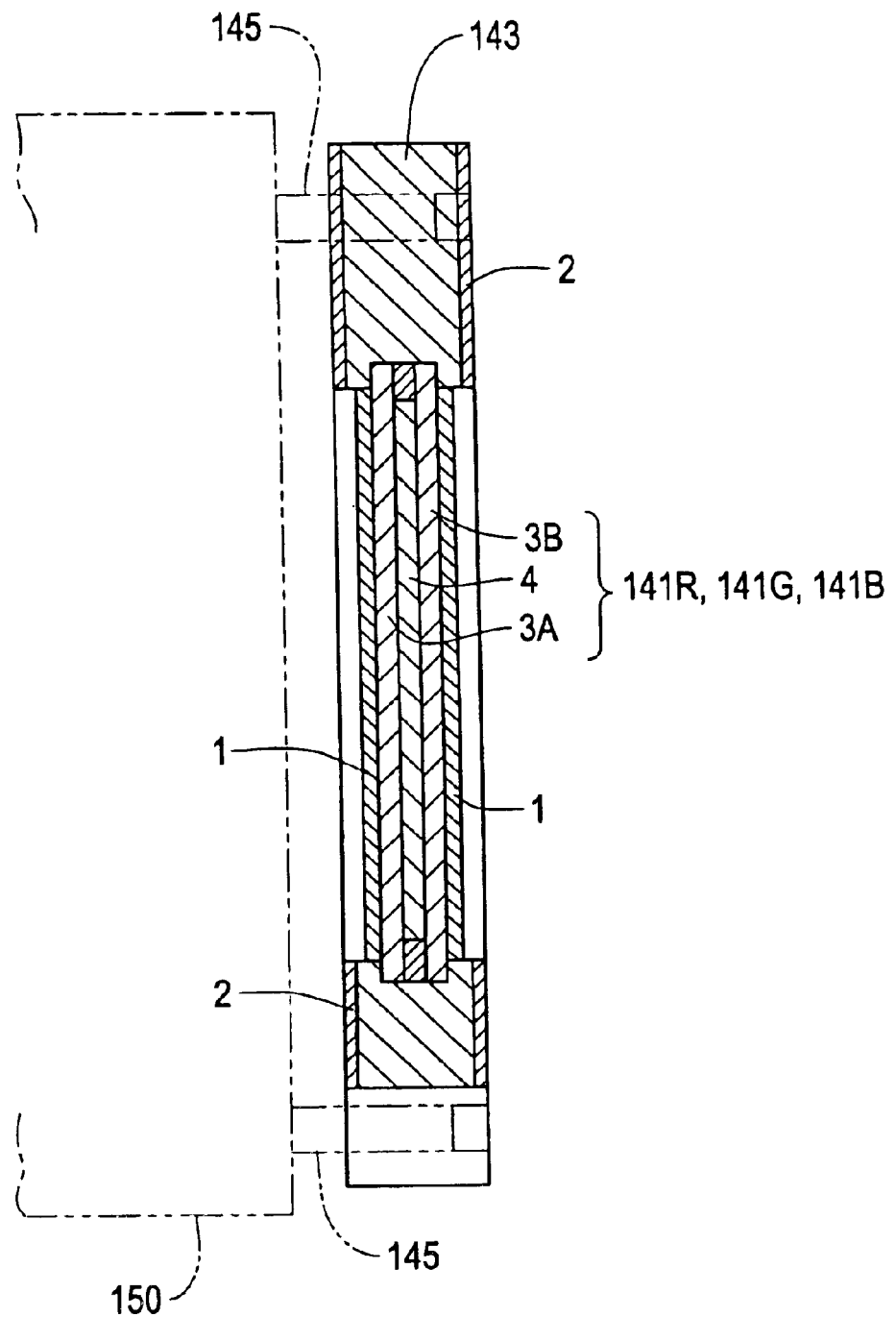
FIG. 4 is a sectional view illustrating a section of the embodiment.

In this embodiment, as shown in FIG. 4, the liquid crystal panels 141R, 141G, and 141B are equipped with a pair of glass substrates $3a$ and $3b$, and a liquid crystal 4, which is an electro-optical element sandwiched between the pair of substrates $3a$ and $3b$. Antistatic layers 1 having a predetermined thickness (e.g. 100 to 200 nm) are provided on the outer surfaces of these substrates $3a$ and $3b$.

The antistatic layers 1 are formed of an inorganic material, specifically, silica ($SiO_2$) and conductive particulates, and are transparent.

The conductive particulates include, for example, metals, such as Pd, Pt, Ru, Ag, Au, Ti, In, Cu, Cr, Fe, Zn, Sn, Ta, W, and Pb, or borides, such as $HfB_2$, $ZrB_2$, $LaB_6$, $CeB_6$, $YB_4$, and $GdB_4$, or carbides, such as TiC, ZrC, HfC, TaC, SiC, and WC, or nitrides, such as TiN, ZrN and HfN, or semiconductors, such as Si and Ge, or carbon. An appropriate one can be selected from among the above.

The antistatic layers 1 have a resistance value ranging from $10^6$ to $10^9$ $\Omega/\square$. If the resistance value exceeds $10^9$ $\Omega/\square$, the antistatic layers will no longer be able to sufficiently release electricity, preventing antistatic effect from being fully displayed.

Treatment layers 2 that have been provided with antistatic treatment are formed on both surfaces of the holding frame 143 installed around the liquid crystal panels 141R, 141G, and 141B. The treatment layers 2 are formed by applying a surfactant to both surfaces of the holding frame 143 by a spray or the like, and it has a predetermined thickness. The treatment layer 2 is also formed on the inner surface of another component made of a synthetic resin, such as the inner case 1000.

Surfactants are roughly divided into the cationic type, the anionic type, the nonionic type, and the amphoteric type. Cationic surfactants include quaternary ammonium salt; anionic surfactants include aliphatic sulfonate, higher alcohol sulfate, and higher alcohol phosphate; nonionic surfactants include higher alcohol ethylene oxide, polyethylene glycol fatty ester, and polyhydric alcohol fatty ester; and amphoteric surfactants include betaine.

(4) Procedure for Forming Antistatic Layers and Treatment Layers

Figure 5:
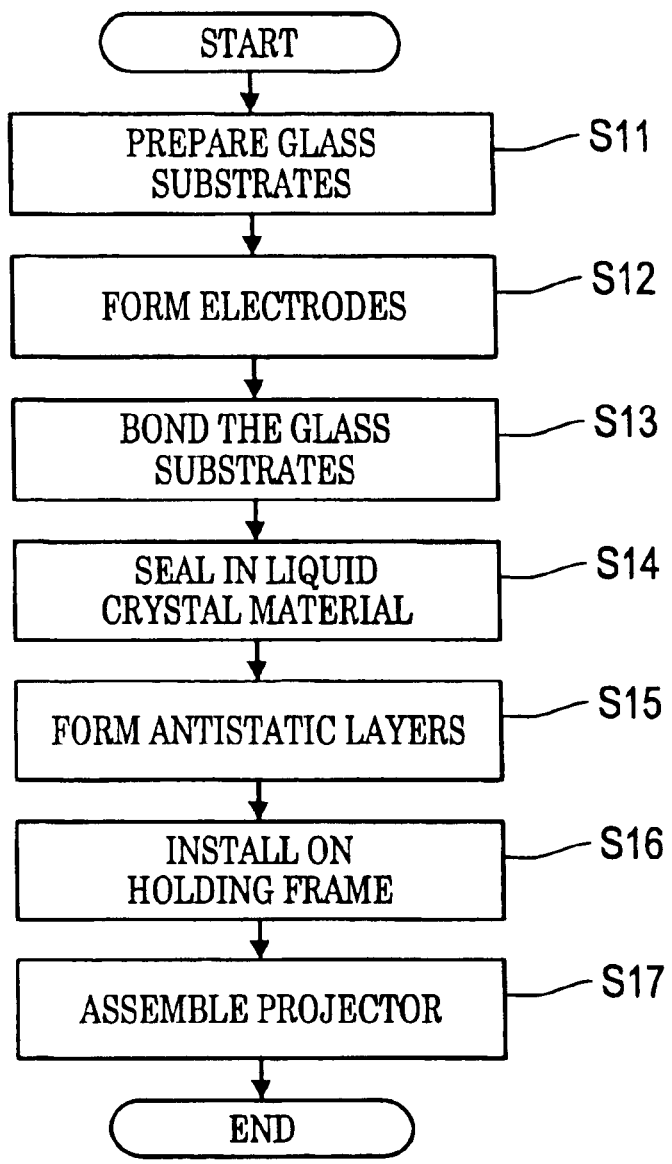
FIG. 5 is a flowchart illustrating a procedure for forming an antistatic layer.

In the process for manufacturing the projector 100 discussed above, the antistatic layers and the treatment layers are formed. The procedure for forming the antistatic layers and the treatment layers will be described in conjunction with the flowchart shown in FIG. 5.

First, the glass substrates 3a and 3b, which are the constituents for the TFTs making up the liquid crystal panels. 141R, 141G, and 141B, are prepared (step S11). Then, TFT elements, predetermined electrodes, etc. are formed on the glass substrate 3a, and common electrodes, etc. are formed on the glass substrate 3b (step S12). Next, these glass substrates 3a and 3b are bonded (step S13), and a liquid crystal material 4 is sealed in therebetween (step S14). The antistatic layers 1 are formed on the surfaces of the panels thus completed (step S15). The antistatic layers 1 are formed by applying a material onto the substrates 3a and 3b by a roller or by any other appropriate method. Furthermore, the substrates 3a and 3b may be provided with anti-reflection layers, as necessary.

The antistatic layers 1 may be formed before step S11. In other words, the substrates 3a and 3b may be provided with the antistatic layers 1 in advance. The step for forming the antistatic layers 1 is preferably implemented in a clean room so as to prevent the adherence of dust or fluff in the step for forming the antistatic layers 1.

After the liquid crystal panels 141R, 141G, and 141B are completed by the steps described above, they are installed to the holding frame 143 (step S16). A surfactant is applied to the surfaces of the holding frame 143 beforehand. In other words, the antistatic treatment may be provided in advance.

Meanwhile, a surfactant is applied to the inner surface of a component of the projector 100, which is made of a synthetic resin, and which is, for example, the inner case 1000, to form the treatment layer 2. More specifically, the inner surface of the inner case 1000 is provided with antistatic treatment.

Thereafter, the components, such as the inner case 1000 provided with the antistatic treatment, and the liquid crystal panels 141R, 141G, and 141B are combined to assemble the projector (step S17), thereby completing the projector 100.

In this embodiment, an alternative method may be adopted wherein the holding frame 143 is attached to the liquid crystal panels 141R, 141G, and 141B, then a surfactant is applied to the holding frame 143.

(5) Advantages of the Embodiment

The embodiment described above provides the following advantages.

Since the antistatic layers 1 are formed on both outer surfaces of the pair of the substrates 3a and 3b, even if static electricity is generated on the surfaces of the substrates 3a and 3b, the static electricity escapes to the outside through the antistatic layers 1. Thus, electrification to the substrates 3a and 3b can be reduced, making it possible to prevent the adherence of dust, fluff, or the like to the surfaces of the substrates 3a and 3b. This allows deterioration of images caused by the adherence of dust, fluff, or the like during a manufacturing process or during the use by a user to be minimized.

Moreover, the above feature obviates the need for or simplifies the work for removing dust, fluff, or the like from the substrates 3a and 3b and the need for equipment required therefor. Hence, the manufacture and maintenance after the manufacture of the liquid crystal panels 141R, 141G, and 141B, and the projector 1000 can be efficiently performed, and the cost required for the manufacture and maintenance can be reduced.

In addition, the need for dust-proof glass, which has hitherto been substantially essential, can be obviated. If the need for the dust-proof glass is obviated, then the number of components can be reduced, so that the manufacturing cost can be reduced from this respect also.

Furthermore, since the electrification to the substrates can be reduced, the destruction of the TFT devices attributable to electrical discharge can be prevented, and defects in a manufacturing process can be reduced.

Moreover, in the embodiment, the component made of a synthetic resin, which is prone to generate static electricity, is provided with antistatic treatment, making it possible to further securely prevent electrification in the projector 100. Hence, the dust or fluff brought in by static electricity generated in the component made of a synthetic resin can be reduced. Thus, image deterioration of the projector can be further securely reduced, and the efficiency of manufacture and maintenance will be further enhanced.

The component made of a synthetic resin is the holding frame 143 installed around the liquid crystal panels 141R, 141G, and 141B. Hence, providing the holding frame 143 with antistatic treatment makes it possible to prevent dust or the like on the holding frame 143 from moving onto the surfaces of the substrates of an electro-optical apparatus, so that the adherence of dust or the like to a substrate can be further securely minimized.

Furthermore, since the inner surface of the inner case 1000 made of a synthetic resin has been provided with antistatic treatment, in addition to the holding frame 143, it is possible to minimize dust or fluff from being transmitted from the inner case 1000 of the projector 100 onto optical components therein.

(6) Modification of the Embodiment

The present invention is not limited to the embodiment described above, but also includes the following modification.

In the foregoing embodiment, the antistatic layers have been provided on the substrate surfaces of the liquid crystal panels 141R, 141G, and 141B, which are the electro-optical apparatuses, and the antistatic treatment is provided on the holding frame 143 of the liquid crystal panels 141R, 141G, and 141B, and on the inner surface of the inner case 1000. Alternatively, however, at least one of the antistatic layer and the antistatic treatment may be provided on other optical elements disposed in the vicinity of the back focus position of the projection lens 160. Providing the antistatic layers 1 or forming the treatment layers 2 by antistatic treatment on those other optical elements makes it possible to prevent the images of dust or the like from being projected, and also to reduce the manufacturing cost of the projector 100. Furthermore, when subjecting those other optical elements to inspection, if the surfaces of the other optical elements are wiped with a rag or the like moistened with an antistatic agent (an inorganic material for forming the antistatic layers 1 or a surfactant for providing the antistatic treatment) before mounting them on an inspecting machine, then an advantage will be obtained in which the surfaces can be cleaned and also the adherence of dust or the like can be minimized.

Figure 6:
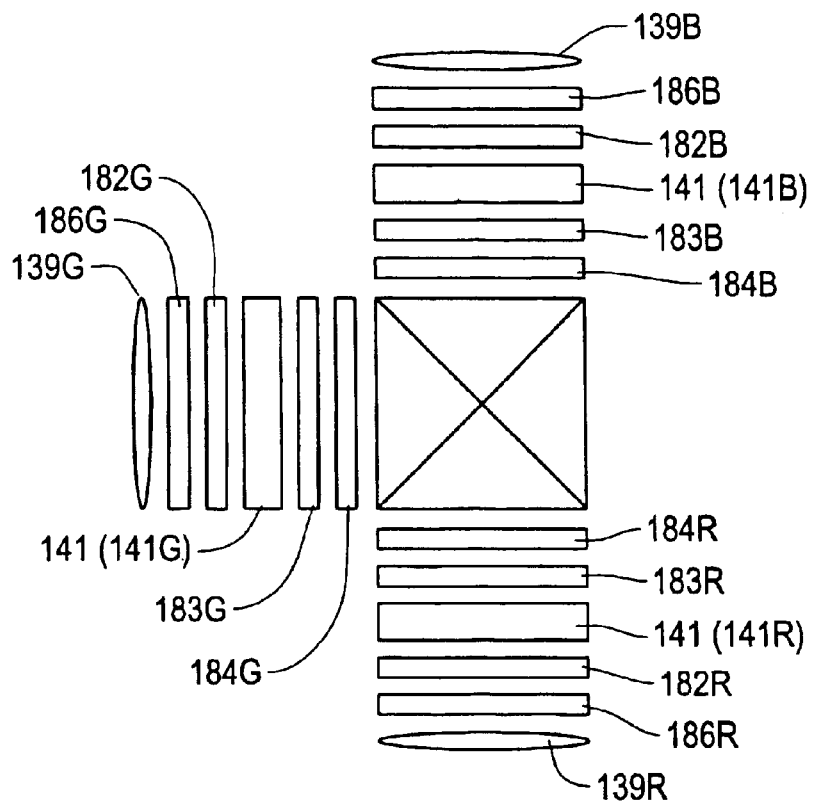
FIG. 6 is an exploded schematic diagram illustrating a structure of an electro-optical apparatus according to an embodiment of the present invention.

Such other optical elements include, for example as shown in FIG. 6, the field lenses 139R, 139G, and 139B, incident polarizer 182B, 182G and 182R, disposed between the field lenses 139R, 139G, and 139B and the liquid crystal panels 141R, 141G, and 141B, emergent polarizers 184B, 184G and 184R, disposed between the liquid crystal panels 141R, 141G, and 14113 and the cross-dichroic prism 150, and a light incident surface of the cross-dichroic prism 150. As necessary, phase plates 183B, 183G and 183R, or visual compensating films 186B 186G and 186R, or the like, for enhancing contrast may be provided between the incident polarizer 182B, 182G and 184R and the field lenses 139R, 139G, and 139B or in an optical path between one of the emergent polarizers 184B, 184G and 184R and the cross-dichroic prism 150. These phase plates 183B, 183G and 183R and the visual compensating films may be included in the foregoing other optical elements.

Regarding the optical elements, such as the field lenses 139R, 139G, and 139B, and the cross-dichroic prism 150, that are constructed by lenses or prisms, the antistatic layer 1 or the antistatic treatment may be directly formed on at least one surface thereof. To provide the antistatic layer 1 or the antistatic treatment on a plate-like or film-like optical element, such as a polarizer, a phase plate, or a visual compensating film, several different methods set forth below are conceivable.

According to a first conceivable method, an antistatic layer or antistatic treatment is directly provided on at least one surface of such an optical element.

Figure 7:
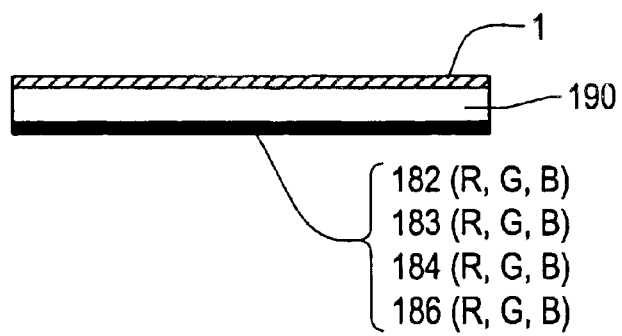
FIG. 7 is a schematic diagram illustrating a structure of a light transmitting substrate according to an embodiment of the present invention.

According to a second conceivable method, if such an optical element is mounted on a light transmitting substrate 190 as shown in FIG. 7 or other optical component, such as a lens or a prism, then the antistatic layer 1 or the antistatic treatment is provided on the opposite surface of the optical component from the surface on which such an optical element is attached. In this case, the optical element may further be provided with the antistatic layer 1 or the antistatic treatment. If the optical element is retained on a holding frame or the like, then the holding frame is preferably provided with an antistatic layer or the antistatic treatment also.

If these optical elements are attached to the surfaces of the substrates of liquid crystal panels, then the antistatic treatment on the substrates of the liquid crystal panels may be omitted by providing the optical elements with antistatic layers or antistatic treatment.

Preferably, the antistatic layers or antistatic treatment is provided on all optical elements disposed in the vicinity of the back focus position of the projection lens 160; however, the advantage described above can be fully obtained simply by providing the antistatic layer or antistatic treatment only on the optical element disposed in a portion especially prone to influence an image.

In the foregoing embodiment, the antistatic layers 1 formed on the liquid crystal panels 141R, 141G, and 141B are formed of an inorganic material. In the present invention, however, the antistatic layers 1 may alternatively be formed of an organic material, and the surfactant applied to the surface of a component made of a synthetic resin may alternatively be applied to the surfaces of the liquid crystal panels 141R, 141G, and 141B. In this case, whatever material may be used for the antistatic layers 1 to be provided on the surfaces of the liquid crystal panels 141R, 141G, and 141B, the material should be transparent.

In the foregoing embodiment, the antistatic treatment on the component made of a synthetic resin has been performed using a surfactant; however, the same inorganic material as that of the antistatic layers 1 may be used on the surface of the component made of a synthetic resin.

The antistatic layers 1 formed on the liquid crystal panels 141R, 141G, and 141B may be provided on at least the surfaces opposing the prism 150, and may not necessarily have to be provided on both surfaces thereof. If, for example, the antistatic layers 1 are provided only on the surfaces of the liquid crystal panels 141R, 141G, and 141B that oppose the prism 150, then even if dust or fluff adheres to the surfaces of the liquid crystal panels 141R, 141G, and 141B that are on the opposite side from the prism 150, the dust or fluff can be easily removed by a blower or the like because a larger space can be secured on this side since the prism 150 is not provided.

Similarly, the antistatic treatment on the holding frame 143 does not necessarily have to be performed on both surfaces; the antistatic treatment may be provided at least on the surface thereof that opposes the prism 150.

The antistatic layer 1 does not necessarily have to be formed on the liquid crystal panels 141R, 141G, and 141B; it may alternatively be formed on another electro-optical apparatus, such as an optical modulating apparatus employing a plasma element or a micro mirror, or an organic EL apparatus.

The specific structures, configurations, etc. of the present invention may vary within the scope wherein the object of the present invention can be attained.

As described above, according to the present invention, the electrification to the substrate of an electro-optical apparatus can be reduced, making it possible to prevent dust, fluff, or the like from adhering to the surface of the substrate. Hence, the deterioration of images caused by the adherence of dust, fluff, or the like during manufacture or the use by a user can be minimized.

Accordingly, the work for removing dust, fluff, or the like from a substrate of an electro-optical apparatus and the equipment therefor is no longer necessary or can be simplified. Hence, the manufacture and maintenance after the manufacture can be efficiently performed, and the cost required for the manufacture and maintenance can be reduced.

What is claimed is:

1. An electro-optical apparatus, comprising:
   a pair of substrates, the pair of substrates having an outer surface;
   a holding frame housing the pair of substrates, the holding frame having an outer surface;
   an electro-optical element sandwiched between the pair of substrates; and
   an antistatic layer provided on the outer surface of the holding frame and at least one of the pair of substrates, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge.

2. The electro-optical apparatus according to claim 1, the antistatic layer being formed of an inorganic material.

3. The electro-optical apparatus according to claim 2, the antistatic layer being formed of silica.

4. The electro-optical apparatus according to claim 3, the antistatic layer having a resistance value ranging from $10^6$ to $10^8$ Ω□.

5. A projector comprising the electro-optical apparatus according to claim 1.

6. A projector, comprising:
   a light source;
   a color separating optical system that separates a light beam emitted from the light source into a plurality of colors;
   a case containing the the light source and the color separating optical system, the case having an inner surface onto which a surfactant is applied to form an antistatic treatment layer;
   a plurality of electro-optical apparatuses that modulate the color beams that have been separated by the color separating optical system, the plurality of electro-optical apparatuses including the electro-optical apparatus according to claim 1;

a prism that synthesizes the color beams that have been modulated by these electro-optical apparatuses; and a projection lens that projects light emitted from the prism.

7. The projector according to claim 6, further comprising a synthetic resin component, the synthetic resin component being provided with antistatic treatment by applying a surfactant.

8. The projector according to claim 7, the synthetic resin component being a holding frame that holds the electro-optical apparatus.

9. A projector, comprising:

a light source;

an electro-optical apparatus according to claim 1 that forms an optical image from a light beam emitted from the light source;

a projection lens that projects a light beam emitted from the electro-optical apparatus;

a field lens disposed adjacent to a light source side of the electro-optical apparatus, at least one surface of the field lens being provided with at least one of an antistatic layer and an antistatic treatment, the anti static layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant; and a case containing the the light source, the color separating optical system and the field lens, the case having an inner surface onto which a surfactant is applied to form an antistatic treatment layer.

10. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus; and an incident polarizer disposed adjacent to a light source side of the electro-optical apparatus, at least one surface of the incident polarizer being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant.

11. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus;

a light transmitting substrate, at least one surface of the light transmitting substrate being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant; and an incident polarizer disposed adjacent to a light source side of the electro-optical apparatus, the incident polarizer being bonded to the light transmitting substrate.

12. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus; and an emergent polarizer disposed adjacent to a projection lens side of the electro-optical apparatus, at least one surface of the emergent polarizer being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant.

13. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus;

a light transmitting substrate, at least one surface of the light transmitting substrate being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant; and an emergent polarizer disposed adjacent to a projection lens side of the electro-optical apparatus, the emergent polarizer being bonded to the light transmitting substrate.

14. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus; and a phase plate disposed adjacent to at least one of a light source side and a projection lens side of the electro-optical apparatus, at least one surface of the phase plate being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant.

15. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus;

a light transmitting substrate, at least one surface of the light transmitting substrate being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant; and a phase plate disposed adjacent to at least one of a light source side and a projection lens side of the electro-optical apparatus, the phase plate being bonded to the light transmitting substrate.

16. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus; and a visual compensating film for enhancing contrast disposed adjacent to at least one of a light source side and a projection lens side of the electro-optical apparatus, at least one surface of the visual compensating film being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant.

17. A projector, comprising:

a light source;

an electro-optical apparatus according to claim 1 that forms an optical image from a light beam emitted from the light source;

a case containing the the light source and the color separating optical system, the case having an inner surface onto which a surfactant is applied to form an antistatic treatment layer;

a projection lens that projects a light beam emitted from the electro-optical apparatus;

a light transmitting substrate, at least one surface of the light transmitting substrate being provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge, the antistatic treatment being formed by applying a surfactant; and a visual compensating film for enhancing contrast disposed adjacent to at least one of a light source side and a projection lens side of the electro-optical apparatus, the visual compensating film being bonded to the light transmitting substrate.

18. A projector, comprising:

a plurality of electro-optical apparatuses that modulate a plurality of color beams, each electro-optical apparatus of the plurality of electro-optical apparatuses being according to claim 1;

a case adjacent each of the plurality of electro-optical apparatuses, the case having an inner surface onto which a surfactant is applied to form an antistatic treatment layer;

a prism that synthesizes the color beams that have been modulated by the electro-optical apparatuses, the prism having a light incident end surface provided with at least one of an antistatic layer and an antistatic treatment, the antistatic layer having a thickness between 100 and 200 nm and containing conductive particulates, the conductive particulates include any of Pd, Pt, Ru, Ti, In, Cu, Cr, Fe, Zn, Ta, W, Pb, $HfB_2$, $ZrB_2$, $LaB_6$, $CeB_6$, $YB_4$, $GdB_4$, TiC, ZrC, HfC, TaC, SiC, WC, TiN, ZrN, HfN, Si and Ge the antistatic treatment being formed by applying a surfactant; and a projection lens that projects the light emitted from the prism.

* * * * *